(12) United States Patent
Mueller

(10) Patent No.: US 7,422,002 B2
(45) Date of Patent: Sep. 9, 2008

(54) METHOD AND APPARATUS FOR CONTROLLING A FUEL INJECTION SYSTEM FOR AN INTERNAL COMBUSTION ENGINE IN A VEHICLE

(75) Inventor: Stephan Mueller, Leonberg (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 93 days.

(21) Appl. No.: 11/477,778

(22) Filed: Jun. 30, 2006

(65) Prior Publication Data

US 2007/0186906 A1    Aug. 16, 2007

(30) Foreign Application Priority Data

Jul. 5, 2005    (DE) .................. 10 2005 031 253

(51) Int. Cl.
*F02M 59/36*    (2006.01)
(52) U.S. Cl. ........................ 123/458; 123/511
(58) Field of Classification Search ............ 123/446, 123/447, 496
See application file for complete search history.

(56) References Cited

U.S. PATENT DOCUMENTS

| | | | | |
|---|---|---|---|---|
| 4,719,889 A * | 1/1988 | Amann et al. | ............... | 123/447 |
| 4,884,545 A * | 12/1989 | Mathis | ................ | 123/447 |
| 5,094,216 A * | 3/1992 | Miyaki et al. | ............... | 123/506 |
| 5,101,797 A * | 4/1992 | Sturz et al. | .................. | 123/496 |
| 5,697,343 A * | 12/1997 | Isozumi et al. | ............... | 123/446 |
| 6,311,674 B1 * | 11/2001 | Igashira et al. | ............... | 123/458 |
| 6,470,857 B2 * | 10/2002 | Takahashi et al. | ............ | 123/462 |
| 6,840,220 B2 * | 1/2005 | Yomogida et al. | ........... | 123/456 |
| 7,261,087 B2 * | 8/2007 | Ricco et al. | .................. | 123/446 |
| 7,287,516 B2 * | 10/2007 | Elliot et al. | .................. | 123/500 |
| 2004/0016830 A1 | 1/2004 | Boos et al. | | |

FOREIGN PATENT DOCUMENTS

| | | |
|---|---|---|
| DE | 198 34 120 A1 | 2/2000 |
| DE | 199 12 966 A1 | 10/2000 |
| EP | 0 964 150 A2 | 12/1999 |
| EP | 1 241 349 A2 | 9/2002 |
| EP | 1 327 766 A2 | 7/2003 |
| EP | 1 357 285 A2 | 10/2003 |

OTHER PUBLICATIONS

European Search Report dated May 16, 2007.

* cited by examiner

*Primary Examiner*—Thomas N Moulis
(74) *Attorney, Agent, or Firm*—Crowell & Moring LLP

(57) ABSTRACT

A method and a device for controlling a fuel injection system for an internal combustion engine of a motor vehicle, whereby the internal combustion engine has a common rail, a high-pressure pump, a flow control valve for controlling the fuel delivery rate of the high-pressure pump into the common rail and a control unit for triggering the flow control valve. The method comprises the steps of determining the prevailing fuel demand in the common rail as a function of the prevailing driving state of the vehicle and controlling the pulse duty factor and frequency of the triggering of the flow control valve as a function of the prevailing fuel demand determined in the common rail.

12 Claims, 6 Drawing Sheets

METHOD AND APPARATUS FOR CONTROLLING A FUEL INJECTION SYSTEM FOR AN INTERNAL COMBUSTION ENGINE IN A VEHICLE

CROSS-REFERENCE TO RELATED APPLICATIONS

This application claims priority to German patent application No. DE 102005031253.5 filed Jul. 5, 2005, the disclosure of which is herein incorporated in its entirety.

BACKGROUND AND SUMMARY OF THE INVENTION

The present invention relates to a method and a device for controlling a fuel injection system for an internal combustion engine of a motor vehicle.

The applicant knows of fuel injection systems having a high-pressure fuel storage system (hereinafter referred to as common rail), a high-pressure pump, a flow control valve for controlling the fuel delivery rate of the high-pressure pump into the common rail and a control unit for triggering the flow control valve.

German Patent DE 198 34 120 also describes a fuel injection system having a flow control valve that controls the pressure buildup in the common rail. Such flow control valves are used for direct injection internal combustion engines in particular.

German Patent DE 199 12 966 A1 describes a fuel injection system in which the pressure in the common rail is created by suitable control of the flow control valve. The flow control valve is arranged on the intake side of the high-pressure pump. As long as the flow control valve is open, the high-pressure pump can draw in fuel, increase its pressure and then deliver it into the common rail.

In the above approaches, however, the fact that the flow control valve is triggered as a function of the pump lift of the high-pressure pump, i.e., in synchronization with the pump lift, has proven to be a disadvantage. In the case of a single-plunger high-pressure pump which is used to generate a fuel high pressure with direct gasoline injection and is driven directly by the internal combustion engine, the high-pressure pump is driven via a camshaft having one or more control cams. The maximum pump delivery is increased with an increase in the diameter and lift of the plunger of the single-plunger high-pressure pump and with an increase in the number of control cams on the camshaft. In general, two control cams are used per cam revolution on the camshaft or, for a higher fuel delivery rate, three control cams may be used. For uniform triggering of the flow control valve in synchronization with the pump lift according to the known principles given above, however, the flow control valve must be triggered in the correct phase with each cam lift because control of the fuel delivery is accomplished by defining the point in time of triggering of the flow control valve.

With these approaches, the disadvantage is that the number of control cams on the camshaft and thus the maximum delivery rate are limited, especially at high engine speeds, because of excessively high triggering frequencies.

To increase the maximum fuel delivery rate and be able to ensure triggering in the correct phase even at high engine speeds, the present applicant is aware of the approach in which two parallel high-pressure pumps each having two control cams are provided instead of a high-pressure pump triggered via a camshaft having four control cams.

However, it has proven to be a disadvantage of this approach that a parallel arrangement of two or more high-pressure pumps results in an increased need for space, increased control complexity, increased manufacturing costs and increased manufacturing complexity.

The object of the present invention is thus to create an improved method and an improved device for controlling a fuel injection system which will ensure accurate control of the desired fuel delivery rate even at high engine speeds.

The idea on which the present invention is based is to provide a method and a device for controlling a fuel injection system for an internal combustion engine of a motor vehicle, whereby the internal combustion engine has a common rail, a high-pressure pump, a flow control valve for controlling the fuel delivery rate of the high-pressure pump into the common rail and a control unit for controlling the flow control valve, whereby the prevailing fuel demand in the common rail is determined as a function of the prevailing driving state of the vehicle by means of a detection device, and the pulse duty factor of the triggering of the flow control valve is controlled by the control unit as a function of the prevailing fuel demand thus determined in the common rail by means of the control unit, whereby the control is executed in synchronization with and independently of the pump lift of the high-pressure pump.

The present invention thus has the advantage over the known approaches that control of the pulse duty factor of the triggering of the flow control valve is implemented not in synchronization with the pump lift but instead in synchronization with the prevailing fuel demand as just determined. The frequency for triggering the flow control valve can thus be separated from the pump lift frequency and reduced, if necessary, and a high-pressure pump can also be triggered by a camshaft having four control cams, for example, even at high rotational speeds. The maximum delivery rate can also be increased to advantage by using four control cams, for example, without resulting in any synchronization problems.

According to a preferred embodiment, the fuel pressure in the common rail is detected by a pressure sensor, whereby the prevailing fuel demand in the common rail is determined by comparing the fuel pressure detected with a setpoint pressure. For example, corresponding setpoint pressures are stored in an engine characteristics map in a respective memory device. Thus by comparing the setpoint pressure with the actual pressure, the prevailing fuel demand in the common rail is detected by a simple method, so that the control of the pulse duty factor of the triggering of the flow control valve can be adapted to the fuel demand detected for supplying a suitable fuel delivery rate to the common rail.

According to another preferred embodiment, the internal combustion engine is designed as a four-cycle engine of a motor vehicle, whereby the high-pressure pump is designed for executing multiple delivery phases during an operating cycle of a cylinder of the internal combustion engine. The high-pressure pump is preferably designed as a single-plunger high-pressure pump. The working cycle of an internal combustion engine that operates by the four-cycle method is understood to be a crank angle of 720° in conjunction with the present invention because the four cycles of an internal combustion engine—intake, compression, power and exhaust take place within this crank angle.

According to another preferred embodiment, the pulse duty factor of the triggering of the flow control valve is controlled as a function of the fuel pressure detected in the common rail and as a function of the rotational speed of the internal combustion engine. In this way, the pulse duty factor of the triggering of the flow control valve can be controlled suitably as a function of the prevailing driving state of the vehicle, whereby both the prevailing engine speed and the prevailing engine load are advantageously taken into account in triggering the pulse duty factor.

Up to a predetermined limit rotational speed of the internal combustion engine, four delivery strokes of the high-pressure pump are preferably preselected, where the flow control valve is triggered uniformly with a predetermined basic frequency as a function of the pump lift, i.e., with pump lift synchronization. Therefore, the flow control valve is triggered with a trigger frequency in the noncritical engine speed range up to the limit speed. Only beyond the predetermined limit speed of the internal combustion engine is the pulse duty factor of the triggering of the flow control valve advantageously controlled as a function of the prevailing fuel demand in the common rail as thus determined. The pulse duty factor is thus controlled in synchronization not with the pump lift but instead with time and as a function of the instantaneous engine load. Thus, at a critical engine speed, i.e., beyond the predetermined limit speed, the trigger frequency of the flow control valve, for example, can be reduced in a suitable manner without falling below the fuel delivery rate required at that moment.

According to another preferred exemplary embodiment, the frequency for triggering the flow control valve is reduced by one half in comparison with a predetermined basic frequency beyond the predetermined limit speed of the internal combustion engine, such that the flow control valve is triggered with every second delivery stroke of the high-pressure pump. In this way, even at high engine speeds, a sufficient amount of time is available for accurate triggering of the flow control valve and satisfactory triggering is ensured. In the case of a high fuel demand in the common rail, the pulse duty factor of triggering the flow control valve is preferably controlled beyond the predetermined limit speed of the internal combustion engine in such a way that the flow control valve is triggered with every second delivery stroke of the high-pressure pump for a full delivery stroke and with the in-between delivery strokes of the high-pressure pump, it is triggered for regulating strokes. As an alternative, when there is a low fuel demand in the common rail, the pulse duty factor of triggering of the flow control valve is preferably controlled beyond the predetermined limit speed of the internal combustion engine such that the flow control valve is triggered for a zero delivery stroke with every second delivery stroke of the high-pressure pump and for regulating strokes with the in-between delivery strokes of the high-pressure pump.

In the case of an intermediate fuel demand between the high and low fuel demand in the common rail, beyond the predetermined limit speed of the internal combustion engine, the pulse duty factor of the triggering of the flow control valve is preferably controlled by a mixed control which consists of alternating operation of the two alternative control operations described above. High-speed operation may thus be accomplished even with a single high-pressure pump that is triggered by a camshaft having four triggering cams, i.e., the usable speed range is advantageously expanded.

Other objects, advantages and novel features of the present invention will become apparent from the following detailed description of the invention when considered in conjunction with the accompanying drawings.

Unless otherwise indicated, the same reference notation is used to refer to the same or functionally identical components in the figures.

DETAILED DESCRIPTION OF THE DRAWINGS

Figure 1:
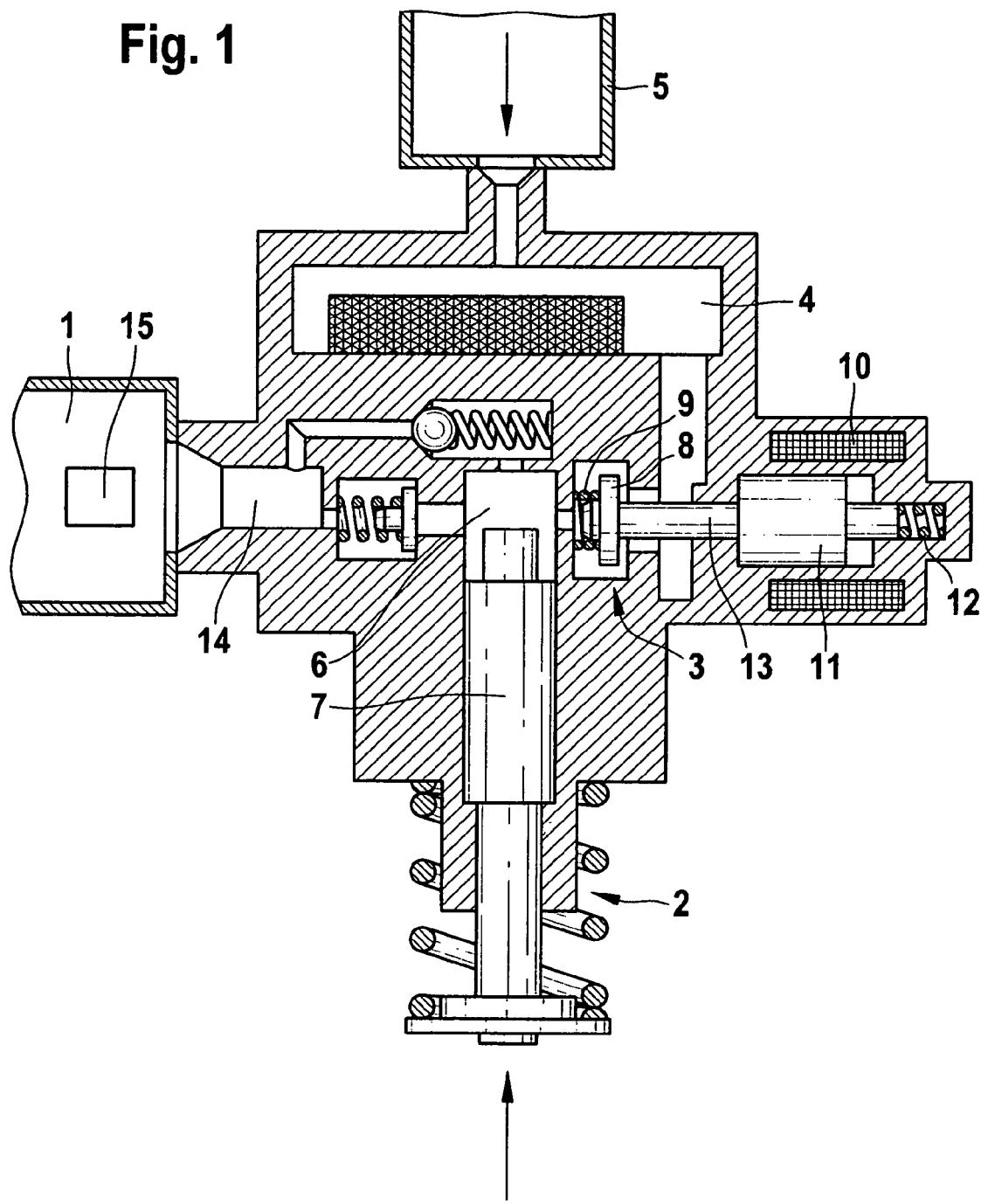
FIG. 1 shows a schematic cross-sectional view of a high-pressure delivery pump of a fuel injection system for an internal combustion engine in accordance with an embodiment of the present invention, in which the flow control valve is in a non-triggered state.
Figure 2:
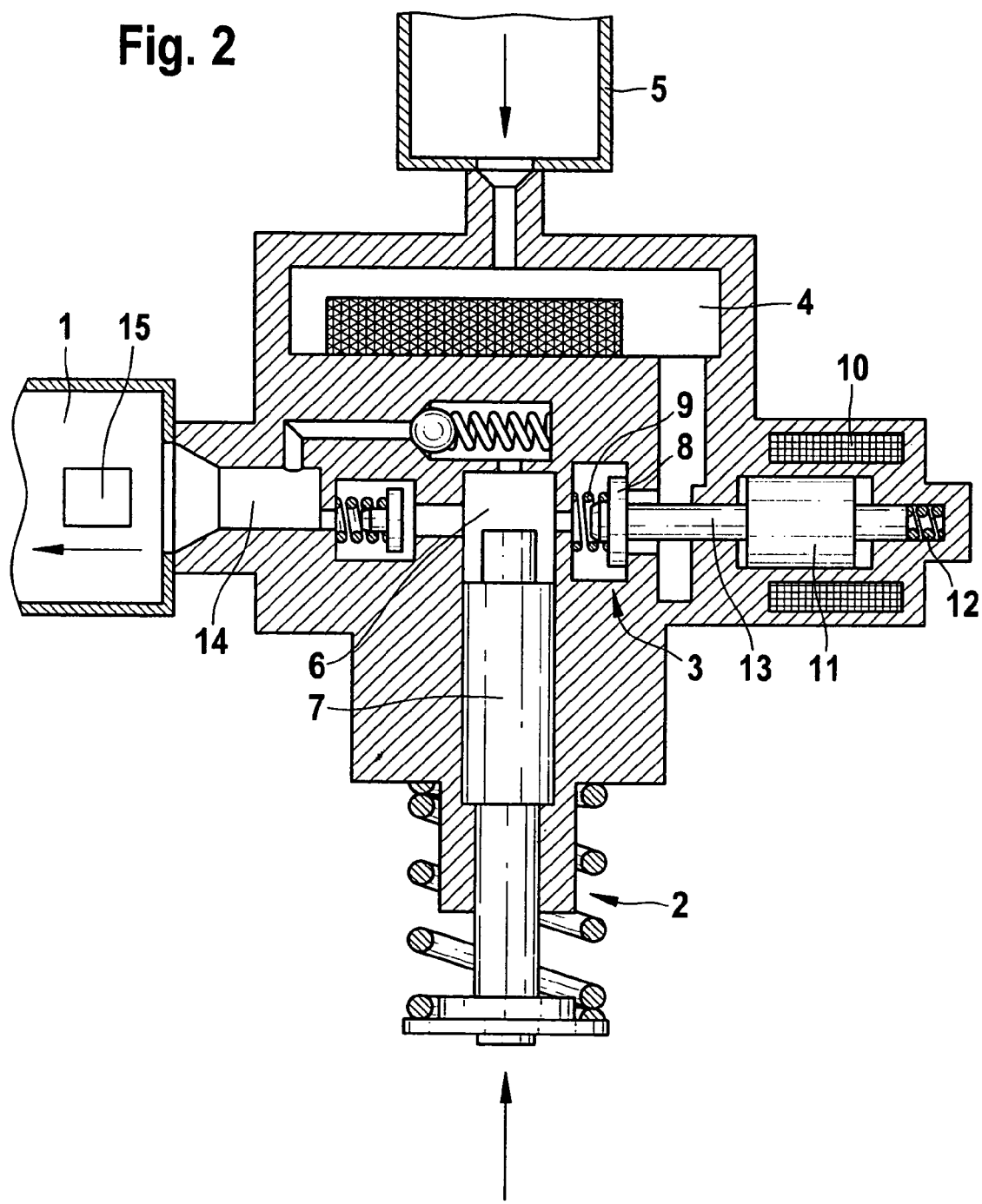
FIG. 2 shows a schematic cross-sectional view of a high-pressure delivery pump of a fuel injection system for an internal combustion engine in accordance with an embodiment of the present invention, in which the flow control valve is in a triggered state.

FIG. 1 and FIG. 2 each illustrate a schematic cross-sectional view of the fuel high-pressure pump of a fuel injection system for an internal combustion engine of a motor vehicle according to an exemplary embodiment of the present invention, whereby the internal combustion engine has a common rail 1, a high-pressure pump 2, a flow control valve 3 and a control unit for triggering the flow control valve. FIG. 1 shows the flow control valve in a non-triggered state, i.e., unpowered, and FIG. 2 shows the same in a triggered state, i.e., powered. The high-pressure pump 2 is preferably designed as a single-plunger high-pressure pump. A single-plunger high-pressure pump is characterized by a simple and sturdy design. The delivery rates are extremely rapidly and reproducibly controllable, i.e., regulable, in the high-pressure space.

The fuel injection system also has injectors (not shown) which receive fuel from the common rail 1. The common rail 1 is connected to the high-pressure pump 2 by a high-pressure line 14. The high-pressure pump 2 is in turn connected to a low-pressure line 4, which is connected to a fuel tank 5 along with a low-pressure delivery pump for supplying the fuel.

The high-pressure pump 2 also has a piston 7, which is slidingly guided in the cylinder pump and protrudes at one end area into the working chamber 6. The end of the piston 7 remote from the working chamber 6 is preferably acted upon by control cams of a drive shaft and/or a camshaft in the installed position, so that the piston 7 is forced to execute a back-and-forth movement with rotation of the drive shaft according to the respective number of cams.

The flow control valve 3 is provided between the low-pressure line 4 and the working chamber 6 of the high-pressure pump 2. The flow control valve 3 consists of a nonreturn valve 8, which is prestressed by a spring 9, for example.

Furthermore, the flow control valve 3 includes a magnetic coil 10 with a spring-loaded armature 11 using a spring 12. The armature 11 also has an armature rod 13 that can be connected to the nonreturn valve 8, so the flow control valve 3 is designed as a solenoid valve that can be triggered by the control unit.

The fuel injection system shown in FIG. 1 and FIG. 2 functions as follows: FIG. 1 shows the non-triggered state of the flow control valve 3, i.e., the unpowered state, in which the nonreturn valve 8 is always open. However, in FIG. 2 the control unit triggers the flow control valve 3, i.e., power is applied to the solenoid valve. In the triggered state, the armature 11 together with the armature rod 13 is drawn into the magnetic coil 10 so that the nonreturn valve 8 is released and opens or closes as a function of the pump lift.

The fuel in the fuel tank 5 is conveyed through the low-pressure line 4 to the high-pressure pump 2. The pump compresses the fuel and delivers it through the high-pressure line 14 into the common rail 1 with the flow control valve 3 closed. The beginning and end of injection of fuel into a certain cylinder can be controlled by triggering the injectors (not shown here). This control is based on certain performance characteristics of the internal combustion engine.

The common rail 1 has a pressure sensor 15 for measuring the prevailing actual pressure in the common rail 1, which is connected to the control unit by signal. The flow control valve 3 is triggered accordingly as a function of the deviation between the measured actual pressure and the setpoint pressure, which is explained in greater detail below. By means of the flow control valve 3, the amount of fuel conveyed by the high-pressure pump 2 and thus the buildup of pressure in the common rail 1 can be controlled. To do so, it is necessary for the flow control valve 3 to be triggered at a certain first point in time and for the triggering to be withdrawn at a certain second point in time, i.e., the pulse duty factor—the ratio of the triggering time to the period—is controlled suitably.

Figure 3:
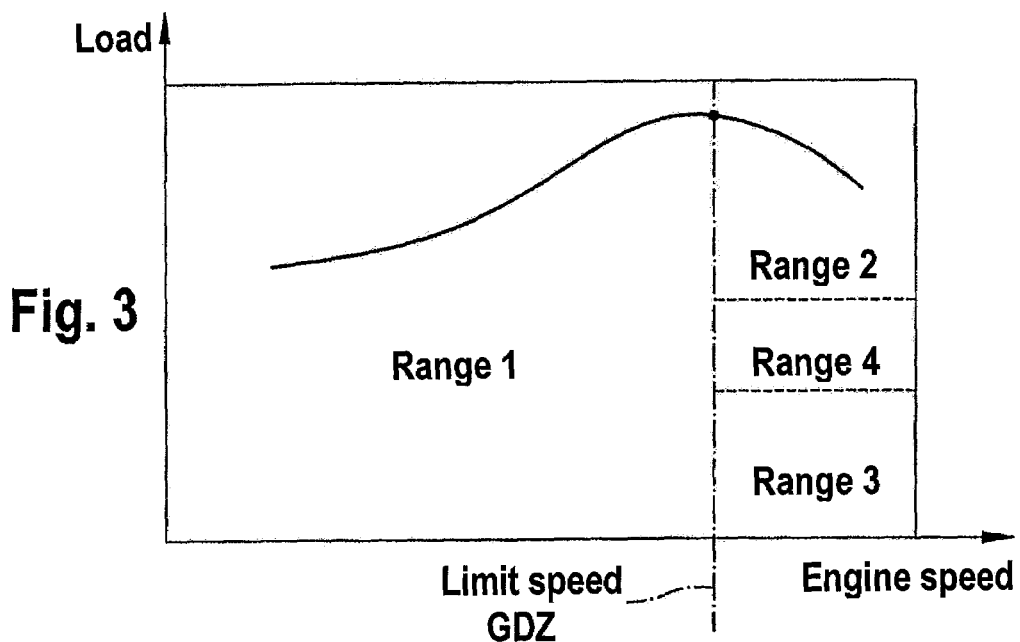
FIG. 3 shows a graphic plot of the engine load as a function of engine speed.

FIG. 3 illustrates a graphic plot of the dependence of the maximum engine load on the engine speed n. The engine load is approximately proportional to the fuel demand per operating cycle in the common rail 1. As FIG. 3 shows, the maximum load and thus the maximum fuel demand per operating cycle in the common rail 1 increase at first steadily with an increase in engine speed n, i.e., they initially increase steadily on operation of the accelerator pedal, with the fuel demand per operating cycle declining again somewhat with a further increase in engine speed n beyond a maximum load. This is due to the fact that the air throughput is reduced beyond a certain engine speed per operating cycle.

As also shown in FIG. 3, a threshold value is preferably defined with regard to the engine speed n, i.e., a limit speed GDZ is defined, corresponding to the engine speed assigned to the maximum load, for example, or being in the range of this engine speed. At an engine speed n below the limit speed GDZ, the flow control valve 3 is preferably triggered with the predetermined basic frequency of the engine speed. This is explained in greater detail below with reference to FIG. 4.

In conjunction with the present invention, an operating cycle of an internal combustion engine that operates by the four-cycle method is understood to refer to a crank angle of 720° because each cylinder runs through the four cycles of a four-cycle engine—intake, compression, power and exhaust—within such an operating cycle.

Figure 4A:
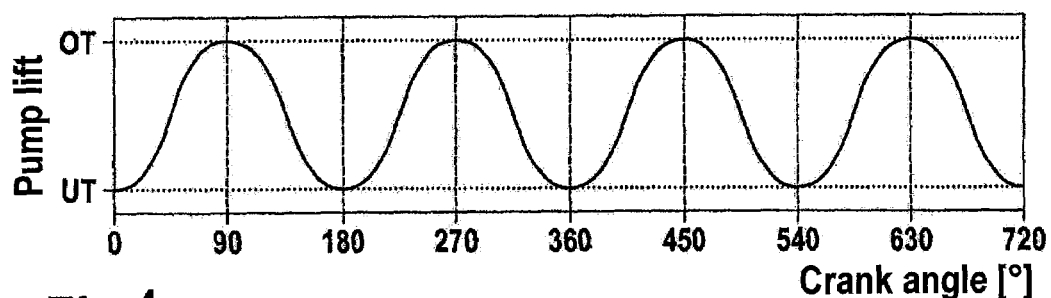
FIG. 4 shows graphic plots of the operating performance of a high-pressure pump during an operating cycle at an engine speed below the limit speed.
Figure 4B:
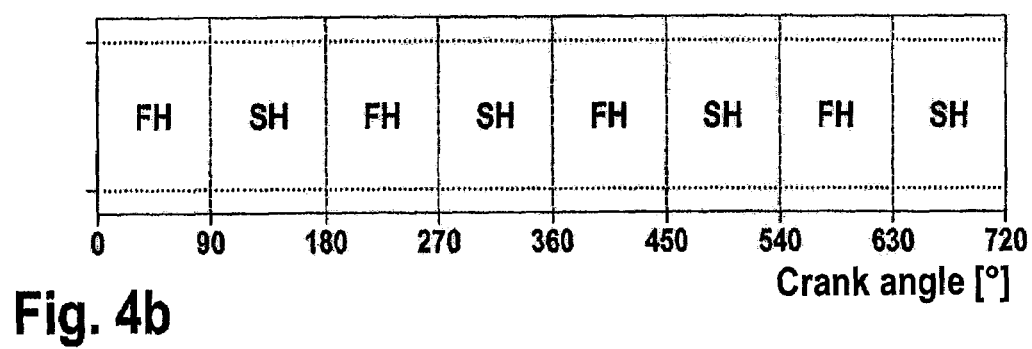
Figure 4C:
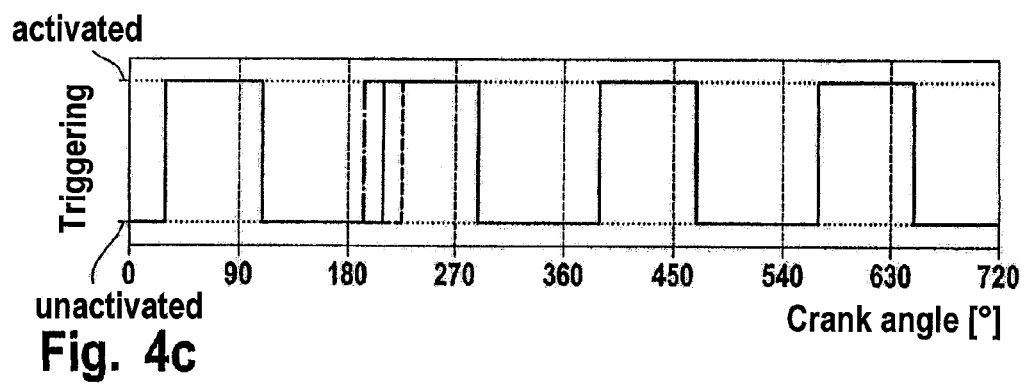
Figure 4D:
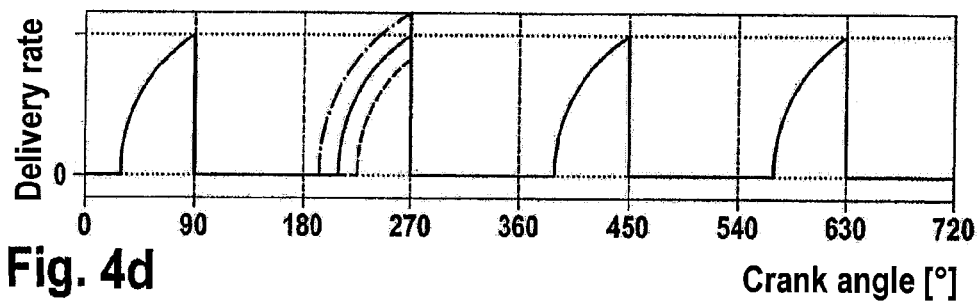

FIG. 4a through FIG. 4d illustrate the performance of the high-pressure pump 2 at an engine speed n lower than the limit speed GDZ mentioned above; FIG. 4a shows the pump lift plotted graphically during an operating cycle; FIG. 4b shows the pump performance during an operating cycle; FIG. 4c shows the triggering during an operating cycle and FIG. 4d shows the fuel delivery during an operating cycle.

As illustrated in FIG. 4a through FIG. 4d, up to the limit speed GDZ, the flow control valve 3 is triggered uniformly for each pump lift as a function of the pump lift, i.e., in synchronization with the pump lift. During each upward movement of the piston 7 from bottom dead center UT [BDC] in the direction of top dead center OT [TDC], i.e., during each delivery stroke FH, the flow control valve is powered at a uniform predetermined stroke level, e.g., after half the crank angle of the delivery stroke FH. After the point in time when power is applied, the flow control valve 3 closes at a delivery stroke FH such that a fuel flow is conveyed into the common rail 1 as long as the piston 7 has reached top dead center OT [TDC].

During each downward movement of the piston 7 from top dead center OT [TDC] in the direction of bottom dead center UT [BDC], i.e., during each intake stroke SH, the triggering, i.e., the lack of power to the flow control valve, is retracted at a uniform predetermined lift level, e.g., after half the crank angle of the intake stroke SH as shown in FIG. 4c in combination with FIG. 4a. No fuel can be delivered due to the pump in an intake stroke SH.

A pulse duty factor of 0.5 of the triggering is selected in each case so that a uniform periodic triggering is ensured. The cycle described above is run through uniformly for each of the four cams on the camshaft, so that four uniform delivery rates are ensured with each delivery stroke FH of the piston 7. The dotted lines shown in FIG. 4c and FIG. 4d illustrate shifts in the triggering point in time, in which case a greater delivery rate is delivered into the common rail 1 with earlier triggering of the flow control valve 3, and a smaller delivery rate is delivered into the common rail 1 with a later triggering of the flow control valve 3 during the delivery stroke FH. This may be utilized to control the total delivery rate during an operating cycle, in which case the triggering point in time can be controlled by the control unit as a function of fuel demand.

Figure 5A:
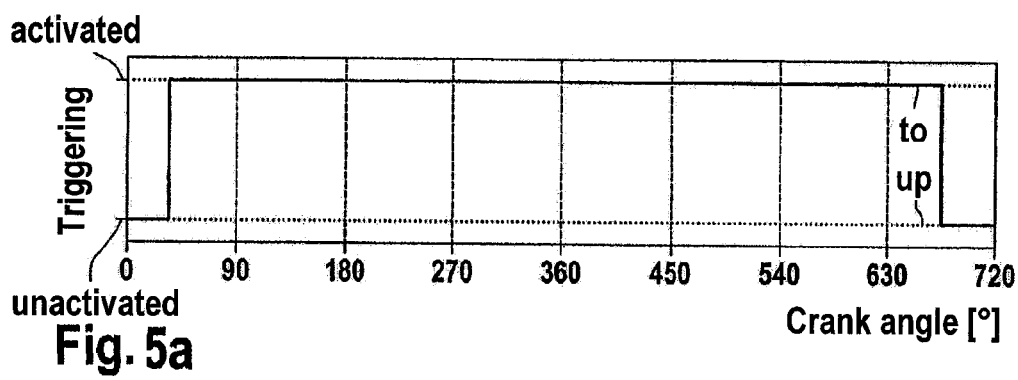
FIG. 5 shows a graphic plot of the operating performance of a high-pressure pump in full delivery operation during an operating cycle.
Figure 5B:
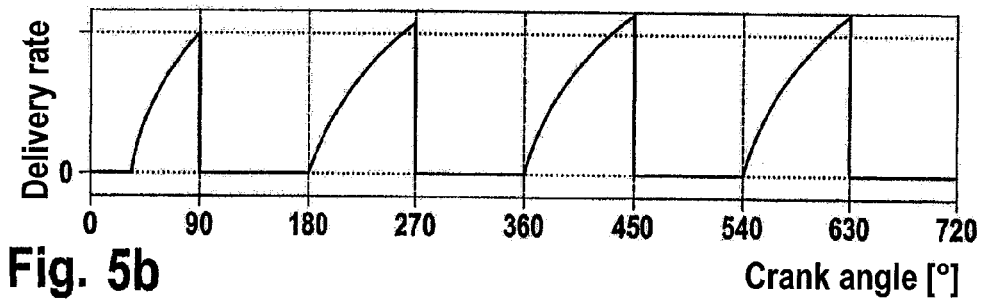

The system consisting of the high-pressure pump 2 with the piston 7 and the flow control valve 3 is preferably designed so that with continuous power to the flow control valve 3 according to FIG. 5a, a fuel flow full delivery rate according to FIG. 5b is achieved because the flow control valve 3 is closed during the entire delivery stroke FH of the piston 7.

Figure 6A:
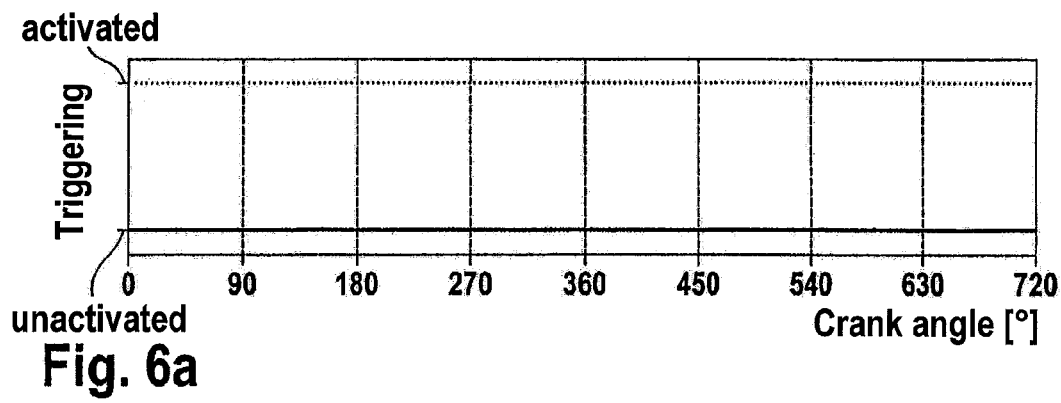
FIG. 6 shows a graphic plot of the operating performance of a high-pressure pump in zero delivery operation during an operating cycle.
Figure 6B:
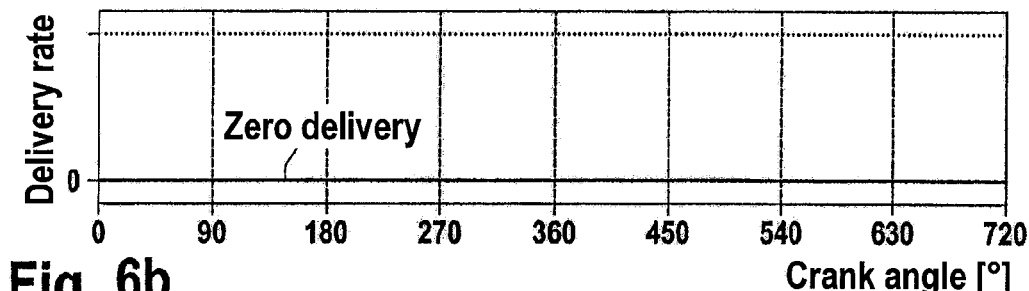

On the other hand, in the case when there is no power to the flow control valve 3 according to FIG. 6a there is zero delivery of fuel according to FIG. 6b because the flow control valve 3 is open during the entire delivery stroke FH of the piston 7 and no pressure can be built up in the working chamber 6 to ensure delivery of a fuel quantity.

According to a preferred exemplary embodiment of the present invention, the flow control valve 3 is triggered up to the predetermined limit speed GDZ according to FIG. 4a through FIG. 4d, i.e., the triggering is performed uniformly for each cam of the camshaft and thus with pump lift synchronization.

At an engine speed above the predetermined limit speed GDZ, the triggering of the flow control valve in synchronization with the pump lift and/or crank angle is preferably converted into a triggering which is no longer synchronous for each pump lift but instead is determined as a function of the instantaneous fuel demand in the common rail 1. This is explained in greater detail below with reference to FIG. 7 through FIG. 9, where FIG. 7 shows a first triggering operation, FIG. 8 shows a second triggering operation and FIG. 9 shows a flow chart of the inventive method according to the preferred exemplary embodiment.

Figure 9:
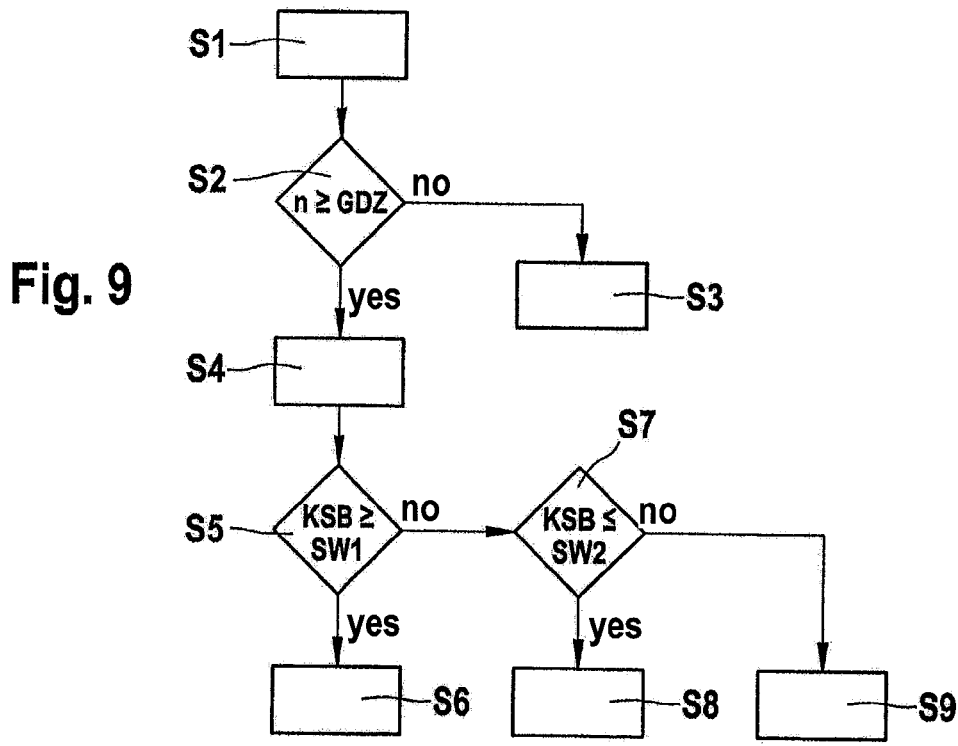
FIG. 9 shows a flow chart of an inventive method according to a preferred embodiment of the present invention.

Step S1 in FIG. 9 denotes the measurement of the prevailing engine speed n by means of a tachometer which is provided in general in conventional automotive systems. The tachometer is connected by signal to the control unit for transmission of the measured engine speed n.

In step S2, the control unit compares the engine speed n with the limit speed GDZ which is stored as an engine characteristics map in a memory device, for example, such that for the case when the measured prevailing engine speed n is below the limit speed GDZ, the flow control valve 3 is triggered in step S3 according to FIG. 4a through FIG. 4d. Reference is made to the preceding discussion in this regard.

If the engine speed n is greater than or equal to the limit speed GDZ, then in step S4 the prevailing fuel demand KSB in the common rail 1 is measured. To do so, the prevailing pressure in the common rail 1 is measured by the aforementioned pressure sensor 15 and the prevailing fuel demand KSB in the common rail 1 is determined by comparing the actual pressure detected with a predetermined setpoint pressure. Characteristic lines for the respective setpoint pressures may in turn be stored in the memory device mentioned above.

The control unit connected to the pressure sensor determines the prevailing fuel demand KSB and controls the pulse duty factor of the triggering of flow control valve 3 as a function of the prevailing fuel demand KSB thus determined.

For example, the control unit compares the prevailing fuel demand KSB thus determined with a first threshold value SW1 in step S5. If the comparison in step S5 reveals that the prevailing fuel demand KSB is greater than or equal to the first threshold value SW1, then there is a high fuel demand in the common rail 1, which is represented graphically by range 2 in FIG. 3.

Figure 7A:
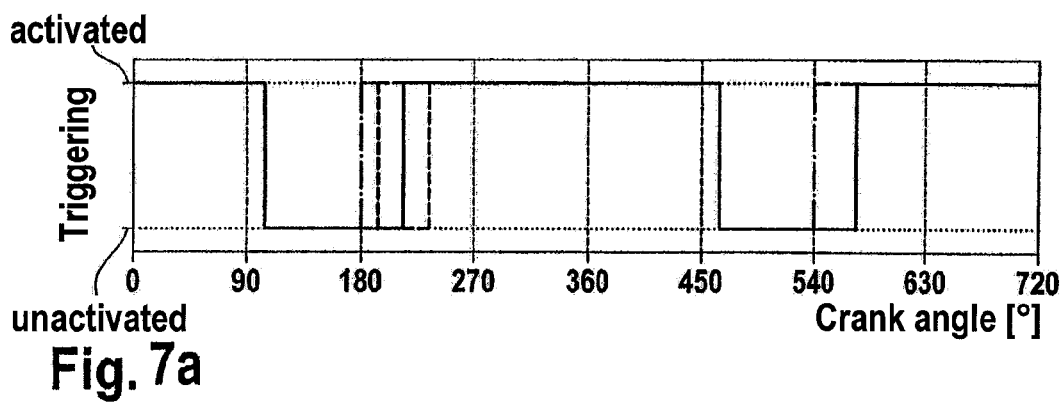
FIG. 7 shows a graphic plot of the operating performance of a high-pressure pump at an engine speed above the limit speed and with a high fuel demand during an operating cycle.
Figure 7B:
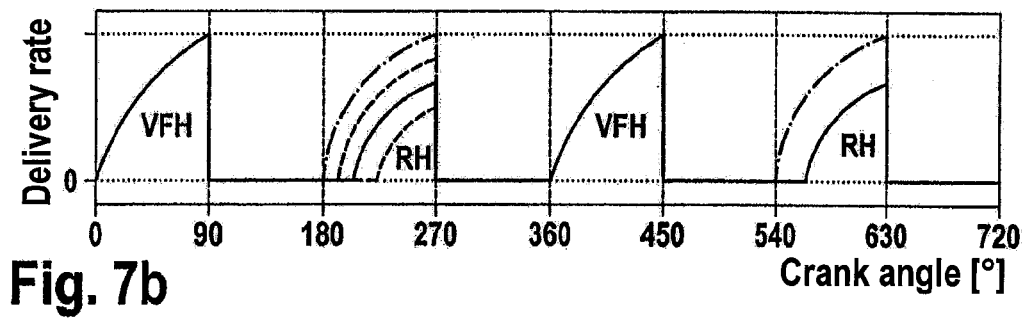

In range 2, the flow control valve 3 is preferably triggered in step S6 according to FIGS. 7a and 7b. The triggering frequency for triggering the flow control valve 3 is reduced preferably by one half in comparison with the basic frequency depicted in FIG. 4c such that every second delivery stroke FH of the high-pressure pump 2 is executed with continuous power flow according to FIG. 5a and is thus used as a full delivery stroke VFH. The delivery strokes FH of the high-pressure pump 2 occurring in between are used as regulating strokes RH, with the delivery rate in these regulating strokes RH being regulated as a function of the triggering point in time as depicted in FIGS. 7a and 7b. The triggering point in time is in turn adjusted by the control unit as a function of the prevailing fuel demand KSB thus determined so that the required pulse duty factor of the triggering of the flow control valve 3 assumes a predetermined value for the desired fuel delivery.

If the comparison in step S5 reveals that the prevailing fuel demand KSB is below the first threshold SW1, then in step S7 a comparison is performed to determine whether the prevailing fuel demand KSB is less than or equal to a second threshold SW2. In this case, there is a low prevailing fuel demand KSB in the common rail 1, which is depicted graphically by range 3 in FIG. 3.

Figure 8A:
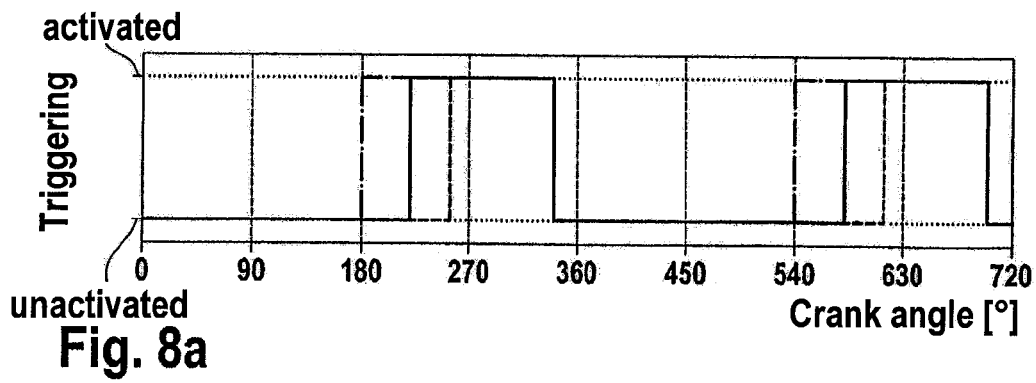
FIG. 8 shows a graphic plot of the operating performance of a high-pressure pump at an engine speed above the limit speed and with a low fuel demand during an operating cycle.
Figure 8B:
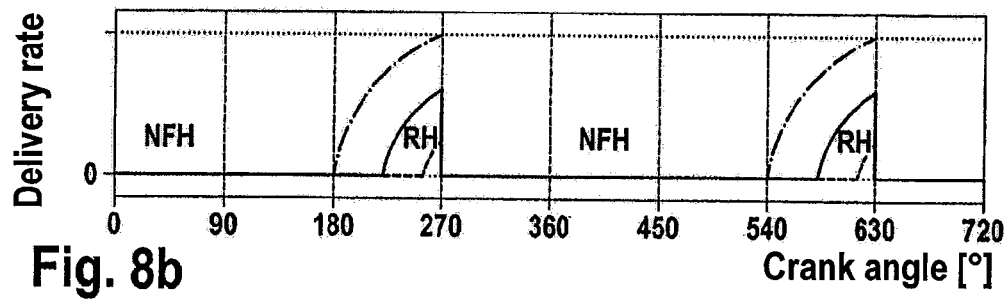

In range 3 the flow control valve 3 is triggered according to FIGS. 8a and 8b, the triggering frequency again preferably being reduced by one half in comparison with the basic frequency depicted in FIG. 4c such that every second delivery stroke FH is executed without power and thus is executed as a zero delivery stroke NFH according to FIG. 6a and FIG. 6b. The delivery strokes FH of the high-pressure pump 2 occurring in between are utilized as regulating strokes RH by analogy with range 2, the delivery rate of the regulating strokes RH again being controlled by the triggering point in time by means of the control unit, as illustrated in FIGS. 8a and 8b.

If the comparison in step S7 shows that the prevailing fuel demand KSB is greater than the second threshold value SW2, then there is an average fuel demand which is between the high fuel demand range 2 and the low fuel demand range 3 and constitutes range 4 according to FIG. 3. In the indifferent range 4, the pulse duty factor of the triggering of the flow control valve 3 is controlled by mixed control which is composed of the control operations according to steps S6 and S8; in other words, the system preferably switches back and forth between control operation according to FIG. 7 and control operation according to FIG. 8 until the prevailing fuel demand in the common rail 1 has been covered.

After a predetermined limit speed, the flow control valve is thus triggered with a reduced triggering frequency in comparison with the basic frequency, the flow control valve is triggered by the inventive controlling of the pulse duty factor and the frequency of triggering of the flow control valve as a function of the prevailing fuel demand process so that even at high engine speeds, a phase-rectified accurate triggering is ensured. Since the inventive method does not require any changes in the fuel injection system, it can be used without any increased cost merely by suitable reprogramming of the control unit.

In conclusion, it should be pointed out that engine characteristics maps can also be saved for the corresponding pulse duty factor of the triggering of the flow control valve assigned to the particular driving performance of the vehicle and it can also be stored to advantage in the memory device for the threshold values SW1 and SW2.

Although the present invention has been described above on the basis of preferred exemplary embodiments, it is not limited to these embodiments but instead may be modified in a variety of ways.

For example, the present invention is not limited to a camshaft having four cams and/or to four-pump lifts during an operating cycle but instead may of course also be applied to any desired number of delivery strokes during an operating cycle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a fuel injection system for an internal combustion engine in a motor vehicle having a common rail, a high-pressure pump and a flow control valve for controlling a fuel delivery rate of the high-pressure pump to the common rail, comprising the steps of:

determining with a detection device a prevailing fuel demand in the common rail as a function of the prevailing driving state of the vehicle; and controlling with a control unit a pulse duty factor of triggering of the flow control valve as a function of the prevailing fuel demand determined in the common rail, wherein the controlling of the pulse duty factor is executed in synchronization with the prevailing fuel demand and independently of a pump lift of the high-pressure pump, wherein the detection device is a pressure sensor, and the prevailing fuel demand in the common rail is determined by comparing a fuel pressure determined by the pressure sensor with a predetermined setpoint pressure, and wherein the pulse duty factor of the triggering of the flow control valve is controlled as a function of the speed of the internal combustion engine.

2. The method as claimed in claim 1, wherein
the internal combustion engine is a four-cycle engine, and
the high-pressure pump is operable to execute a plurality of delivery phases during one four-cycle operating cycle of a cylinder of the internal combustion engine.

3. The method as claimed in claim 1, wherein
four delivery strokes of the high-pressure pump occur during an operating cycle of a cylinder, and
up to a predetermined limit speed of the internal combustion engine, the flow control valve is controlled with synchronization of the pump lift and with a predetermined basic frequency as a function of the pump lift of the high-pressure pump.

4. The method as claimed in claim 3, wherein above the predetermined limit speed of the internal combustion engine, the pulse duty factor of the triggering of the flow control valve is controlled independently of the pump lift of the high-pressure pump and in synchronization as a function of the prevailing fuel demand in the common rail.

5. The method as claimed in claim 4, wherein above the predetermined limit speed of the internal combustion engine, the frequency for triggering the flow control valve is reduced to one half in comparison with the predetermined basic frequency such that the flow control valve is triggered only with every second delivery stroke of the high-pressure pump.

6. The method as claimed in claim 5, wherein with a high fuel demand in the common rail above the predetermined limit speed of the internal combustion engine, the pulse duty factor of the triggering of the flow control valve is controlled such that the flow control valve is triggered with every second delivery stroke of the high-pressure pump for a full delivery stroke and with every delivery stroke between the second delivery strokes is triggered for regulating strokes.

7. The method as claimed in claim 6, wherein when there is a low fuel demand in the common rail, the pulse duty factor of the triggering of the flow control valve is controlled above the predetermined limit speed of the internal combustion engine such that with every second delivery stroke of the high-pressure pump, the flow control valve is triggered for a zero delivery stroke, and with every delivery stroke between the second delivery strokes is triggered for regulating strokes.

8. The method as claimed in claim 7, wherein when there is an intermediate fuel demand between high and low fuel demand in the common rail, the pulse duty factor of the triggering of the flow control valve of the internal combustion engine is controlled by a mixed control of one of triggering of the flow control valve:
such that the flow control valve is triggered with every second delivery stroke of the high-pressure pump for a full delivery stroke and with every delivery stroke between the second delivery strokes is triggered for regulating strokes, or
such that with every second delivery stroke of the high-pressure pump, the flow control valve is triggered for a zero delivery stroke, and with every delivery stroke between the second delivery strokes is triggered for regulating strokes.

9. A device for controlling a fuel injection system for an internal combustion engine of a motor vehicle, comprising:
a common rail;
a detection unit for determining a, prevailing fuel demand in the common rail as a function of a prevailing driving state of the vehicle;
a high-pressure pump arranged to provide fuel to the common rail;
a flow control valve arranged to control a fuel delivery rate of the high-pressure pump to the common rail; and
a control unit connected to the detection unit and the flow control valve for controlling a pulse duty factor of triggering of the flow control valve as a function of a speed of the internal combustion engine and the prevailing fuel demand determined in the common rail, independently of the pump lift of the high-pressure pump,
wherein the detection unit is a pressure sensor for detecting the fuel pressure in the common rail, and
the control unit is programmed to determine the prevailing fuel demand in the common rail by comparing a fuel pressure determined by the pressure sensor with a setpoint pressure.

10. The device as claimed in claim 9, wherein
the internal combustion engine is a four-cycle engine of a motor vehicle, and
the high-pressure pump is operable to execute a plurality of delivery phases during one four-cycle operating cycle of a cylinder of the internal combustion engine.

11. The device as claimed in claim 10, wherein
the high-pressure pump and the common rail are interconnected via a high-pressure line.

12. The device as claimed in claim 11, wherein the flow control valve is open when not triggered by the control unit and is closed when triggered by the control unit.

* * * * *